UNITED STATES PATENT OFFICE.

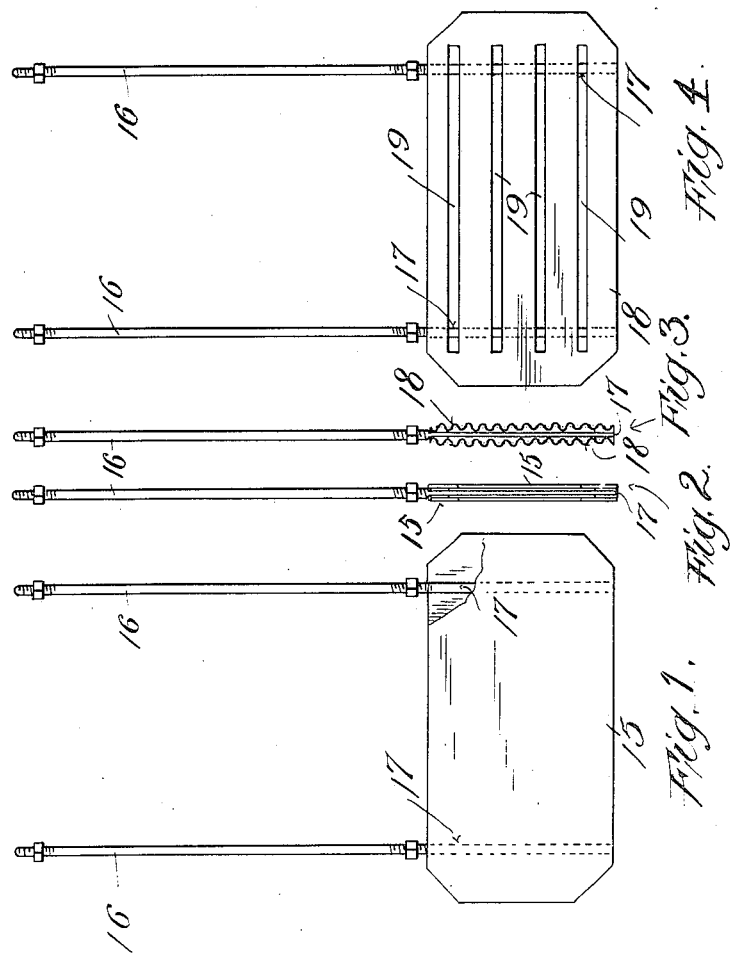

JOHN B. BURDETT, OF CHICAGO, ILLINOIS, ASSIGNOR TO DAVIS-BOURNONVILLE COMPANY, OF NEW YORK, N. Y., AND CHICAGO, ILLINOIS, A CORPORATION OF NEW YORK.

ELECTRODE FOR ELECTROLYTIC CELLS.

1,154,092.  Specification of Letters Patent.  Patented Sept. 21, 1915.

Application filed October 29, 1912. Serial No. 728,388.

*To all whom it may concern:*

Be it known that I, JOHN B. BURDETT, a citizen of the United States, residing at Chicago, county of Cook, State of Illinois, have made a certain new and useful Invention in Electrodes for Electrolytic Cells, of which the following is a specification.

This invention relates to electrodes for electrolytic cells.

The object of the invention is to provide an electrode structure which offers the least possible electrical resistance in the connections thereof.

A further object is to produce an electrode of such construction as to reduce the internal electrical resistance of the cell.

Other objects of the invention will appear more fully hereinafter.

The invention consists substantially in the construction, combination, location and relative arrangement of parts, all as will be more fully hereinafter set forth, as shown in the accompanying drawing and finally pointed out in the appended claims.

Figure 1 is a view in side elevation partly broken, of one form of electrode embodying my invention. Fig. 2 is an end view of the same. Fig. 3 is a view similar to Fig. 2, showing the electrode plates as being corrugated. Fig. 4 is a view similar to Fig. 1 showing the electrode plates with slots or openings therethrough.

In the manufacture of oxygen and hydrogen for commercial use, it is a common practice to subject an aqueous caustic alkali solution, acid, or other suitable liquid, to the decomposing action of an electric current in an electrolytic cell containing the solution. In this operation electrode plates are immersed in the solution and the terminals of an electric circuit are connected to the plates, said plates being separated and insulated from each other. The passage of the electric current through the electrolyte decomposes the liquid and oxygen gas is evolved at one electrode plate, while hydrogen gas is evolved at the other electrode plate. These gases are separately collected and conducted away from the cell to suitable storage tanks or containers for use in the industries and arts. In order to attain the best results as well as efficient and economical operation of the electrolytic cell, it is exceedingly desirable to reduce the internal electrical resistance of the cell to the lowest possible point. It is also desirable to present as much surface area of the electrode plates within the available space therefor as is possible, thereby reducing to the lowest point the intensity of current per unit of surface, while at the same time permitting an efficient circulation of the electrolyte.

It is among the special purposes of my present invention to provide an electrode plate for use in electrolytic cells of this nature which attains these and other desirable objects and purposes.

In Figs. 1 and 2 I have shown my invention in one form of embodiment thereof and wherein 15 designates the electrode plates, placed side by side and in close proximity to each other, but separated slightly apart. In this form, the plates are of generally rectangular shape and are composed of suitable metal and, in operation, are designed to be immersed in the electrolyte, and preferably to a depth sufficient for the hydrostatic head or pressure of the electrolyte to serve the function of restraining or retarding the gas evolved from the electrolyte at or in the region of the plates from escaping through the body of the electrolyte so as to become mingled together, and of enabling the separated gases to be collected and conducted away for storage and use in any suitable, convenient, or well known manner. The circuit terminals are connected to the plates 15 by means of the rods 16. In order to reduce the electrical resistance of the cell to the lowest possible point, particularly in the connection of the poles 16 to the plates 15, said poles are provided with extensions 17 which extend transversely of the plates through the space separating the plates, and are fused, welded, or otherwise secured to the inner or opposed surfaces of the plates. In order to secure an efficient circulation of the electrolyte and to increase the contact area of the plates, said plates may be provided with longitudinal slots or openings 19, see Fig. 4. The same result may be obtained by suitably crimping or corrugating the plate as indicated at 18, Fig. 3.

An electrolytic cell employing electrode plates constructed in accordance with my invention is efficient and economical in operation and in the production of oxygen and hydrogen for commercial use, the current required being greatly minimized by reason of the reduction in the intensity thereof of per unit of surface of the electrode plates as well as by the reduction effected of the internal electrical resistance of the cell.

It is obvious that the electrode plates embodying my invention may be assembled, insulated and relatively arranged and supported within the cell in any suitable or convenient manner and the details thereof form no part of my present invention.

Having now set forth the object and nature of my invention and various forms of electrode plates embodying the principles thereof, what I claim as new and useful and of my own invention, and desire to secure by Letters Patent, is—

1. An electrode for electrolytic cells comprising a pair of metal plates arranged in parallel relation adjacent each other, and circuit terminal rods or poles having extensions interposed between said plates and extending transversely thereacross, and homogeneously connected thereto, said plates being longitudinally crimped or corrugated.

2. An electrode for electrolytic cells comprising a pair of metal plates arranged in parallel relation adjacent each other, and circuit terminal rods or poles having extensions interposed between said plates and extending transversely thereacross, and homogeneously connected thereto.

In testimony whereof I have hereunto set my hand in the presence of the subscribing witnesses, on this 12th day of October A. D., 1912.

JOHN B. BURDETT.

Witnesses:
 FRANK JOHNSON,
 S. E. DARBY.